United States Patent
Saussele et al.

(10) Patent No.: US 10,263,461 B2
(45) Date of Patent: Apr. 16, 2019

(54) SMART DC MICROGRID PARKING STRUCTURES USING POWER LINE COMMUNICATIONS

(71) Applicants: Robert Bosch LLC, Broadview, IL (US); Robert Bosch GmbH, Stuttgart (DE)

(72) Inventors: John Saussele, Cornelius, NC (US); Dusan Brhlik, Cornelius, NC (US); Sharmila Ravula, Los Altos, CA (US); Tim Strunck, Huntersville, NC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/484,471

(22) Filed: Apr. 11, 2017

(65) Prior Publication Data
US 2017/0302107 A1 Oct. 19, 2017

Related U.S. Application Data (60) Provisional application No. 62/321,770, filed on Apr. 13, 2016.

(51) Int. Cl.
*H02J 13/00* (2006.01)
*G08G 1/14* (2006.01)
(Continued)

(52) U.S. Cl.
CPC ....... *H02J 13/0003* (2013.01); *B60L 11/1816* (2013.01); *B60L 11/1838* (2013.01);
(Continued)

(58) Field of Classification Search
CPC ........ H02J 13/0003; H02J 5/00; H02J 7/0027; H02J 7/35; H02J 1/10; H02J 3/383;
(Continued)

(56) References Cited

U.S. PATENT DOCUMENTS 5,504,314 A * 4/1996 Farmont ................... E04H 6/42
  194/902
5,926,004 A * 7/1999 Henze ................... B60L 3/0046
  307/82

(Continued)

FOREIGN PATENT DOCUMENTS

AU    2015255250 A1    12/2015
WO    2011127449 A2    10/2011

OTHER PUBLICATIONS

Robert Bain, "Can power over Ethernet transform how we control lights in the workplace?", http://luxreview.com/article/2015/06/when-power-meets-intelligence, Jun. 12, 2015, Accessed Apr. 11, 2017.

(Continued)

*Primary Examiner* — Hal Kaplan
*Assistant Examiner* — Elim Ortiz
(74) *Attorney, Agent, or Firm* — Maginot Moore & Beck LLP (57) ABSTRACT

A power system for a vehicle parking structure is disclosed. The power system comprises: a DC voltage bus arranged throughout the vehicle parking structure and configured to distribute DC power throughout the vehicle parking structure; at least one DC power source operably connected to the DC voltage bus and configured to provide DC power to the DC voltage bus; a plurality of DC loads arranged throughout the vehicle parking structure and operably connected to the DC voltage bus, the plurality of DC loads being configured to operate using DC power from the DC voltage bus; and a control system operably connected to the DC voltage bus and configured to communicate with at least one DC load in the plurality of DC loads using data signals transmitted via the DC voltage bus.

17 Claims, 4 Drawing Sheets

(51) Int. Cl.
| | |
|---|---|
| *H02J 1/10* | (2006.01) |
| *H02J 5/00* | (2016.01) |
| *H04B 3/54* | (2006.01) |
| *H02J 7/00* | (2006.01) |
| *H02J 7/35* | (2006.01) |
| *B60L 11/18* | (2006.01) |
| *H02J 3/38* | (2006.01) |

(52) U.S. Cl.
CPC ............... *G08G 1/142* (2013.01); *H02J 1/10* (2013.01); *H02J 5/00* (2013.01); *H02J 7/0027* (2013.01); *H02J 7/35* (2013.01); *H04B 3/542* (2013.01); *H04B 3/548* (2013.01); *B60L 2230/22* (2013.01); *B60L 2230/24* (2013.01); *B60L 2230/28* (2013.01); *H02J 3/383* (2013.01); *Y02E 10/563* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 10/126* (2013.01); *Y04S 30/12* (2013.01)

(58) Field of Classification Search
CPC .............. B60L 11/1816; B60L 11/1838; B60L 2230/24; B60L 2230/22; B60L 2230/28; H04B 3/542; H04B 3/548; G08G 1/142
See application file for complete search history.

(56) References Cited

U.S. PATENT DOCUMENTS

| | | |
|---|---|---|
| 2004/0130292 A1 | 7/2004 | Buchanan et al. |
| 2010/0181957 A1 | 7/2010 | Goeltner |
| 2011/0127944 A1 | 6/2011 | Saito et al. |
| 2012/0221703 A1* | 8/2012 | Schwager ............... B60L 1/04 709/223 |
| 2013/0076294 A1 | 3/2013 | Smith |
| 2013/0211988 A1 | 8/2013 | Dorn et al. |
| 2014/0266046 A1 | 9/2014 | Baxter et al. |
| 2017/0098374 A1* | 4/2017 | Sullivan ............... G06F 17/00 |

OTHER PUBLICATIONS

International Search Report and Written Opinion corresponding to PCT Application No. PCT/EP2017/058491 (13 pages).

* cited by examiner

SMART DC MICROGRID PARKING STRUCTURES USING POWER LINE COMMUNICATIONS

This application claims the benefit of priority of U.S. provisional application Ser. No. 62/321,770, filed on Apr. 13, 2016 the disclosure of which is herein incorporated by reference in its entirety.

TECHNICAL FIELD

The device and method disclosed in this document relates to parking structure power systems and, more particularly, to the use of power line communications in DC microgrid parking structure power systems.

BACKGROUND

Multi-level parking structures for private individual and commercial vehicles are commonplace in the modern world. Such parking structures typically include many floors of parking spaces stacked on top of one another to enable hundreds of vehicles to be parked on a relatively small plot of land. In urban areas, similar parking structures are often constructed underground, beneath large buildings.

Such parking structures are often operated 24/7 and incur fairly substantial operating costs. Since natural lighting is only available to above-ground parking spaces at the very perimeter of the structure, at a minimum, the parking structure must have a lighting system that operates throughout the day as well as night for safety and security purposes. Additionally, underground parking structures often must have ventilation systems that include large ventilation fans for maintaining proper circulation of air in the parking structure. Parking structures may also have elevator systems, security cameras, automated gates with electronic ticketing and payment kiosks, electric vehicle (EV) chargers, and other such systems that must be operated at all hours of the day.

Typical parking structures have alternating current (AC) power distribution systems that provide AC power to the various loads of the parking structure. The use of AC power distribution systems makes it difficult to integrate cost-saving and resilient power systems, such as a photovoltaic array. The parking structure often also includes several discrete control systems with associated separate wiring running throughout the structure for the various systems of the parking structure. The additional control systems and lengthy wiring add to the complexity and expense of building, maintaining and operating the parking structure.

Large parking structures are also difficult and confusing to navigate for those who park their vehicles in the structure. Generally, the user enters the structure at one of only a few entrances and must navigate to find an empty parking spot on his or her own. Often this results in frustration as the user inadvertently drives in circles or becomes lost in the parking structure, and "competes" with other drivers for open parking spaces. When a parking structure is busy, this results in needless vehicle congestion within the parking structure. Finally, after a user has found a parking spot and has gone about his or her business, the user will often return to the parking structure having forgotten where he or she has parked the vehicle. Operators often try to address some of these issues with signs and labels throughout the parking structure. In some instances, the operators hire employees that keep track of which parts of the structure are full and assist users in navigating the structure to find an empty parking spot. However, this even further increases the operating costs of the parking structure.

What is needed is a system that simplifies and reduces the cost of operating a parking structure while also making the parking structure easier and more convenient to use by those who park their vehicle in the structure.

SUMMARY

A power system for a vehicle parking structure is disclosed. The power system comprises: a DC voltage bus arranged throughout the vehicle parking structure and configured to distribute DC power throughout the vehicle parking structure; at least one DC power source operably connected to the DC voltage bus and configured to provide DC power to the DC voltage bus; a plurality of DC loads arranged throughout the vehicle parking structure and operably connected to the DC voltage bus, the plurality of DC loads being configured to operate using DC power from the DC voltage bus; and a control system operably connected to the DC voltage bus and configured to communicate with at least one DC load in the plurality of DC loads using data signals transmitted via the DC voltage bus.

BRIEF DESCRIPTION OF THE DRAWINGS

The foregoing aspects and other features of a power system for a parking structure are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

DC Power Distribution System for Vehicle Parking Structures

Figure 1:
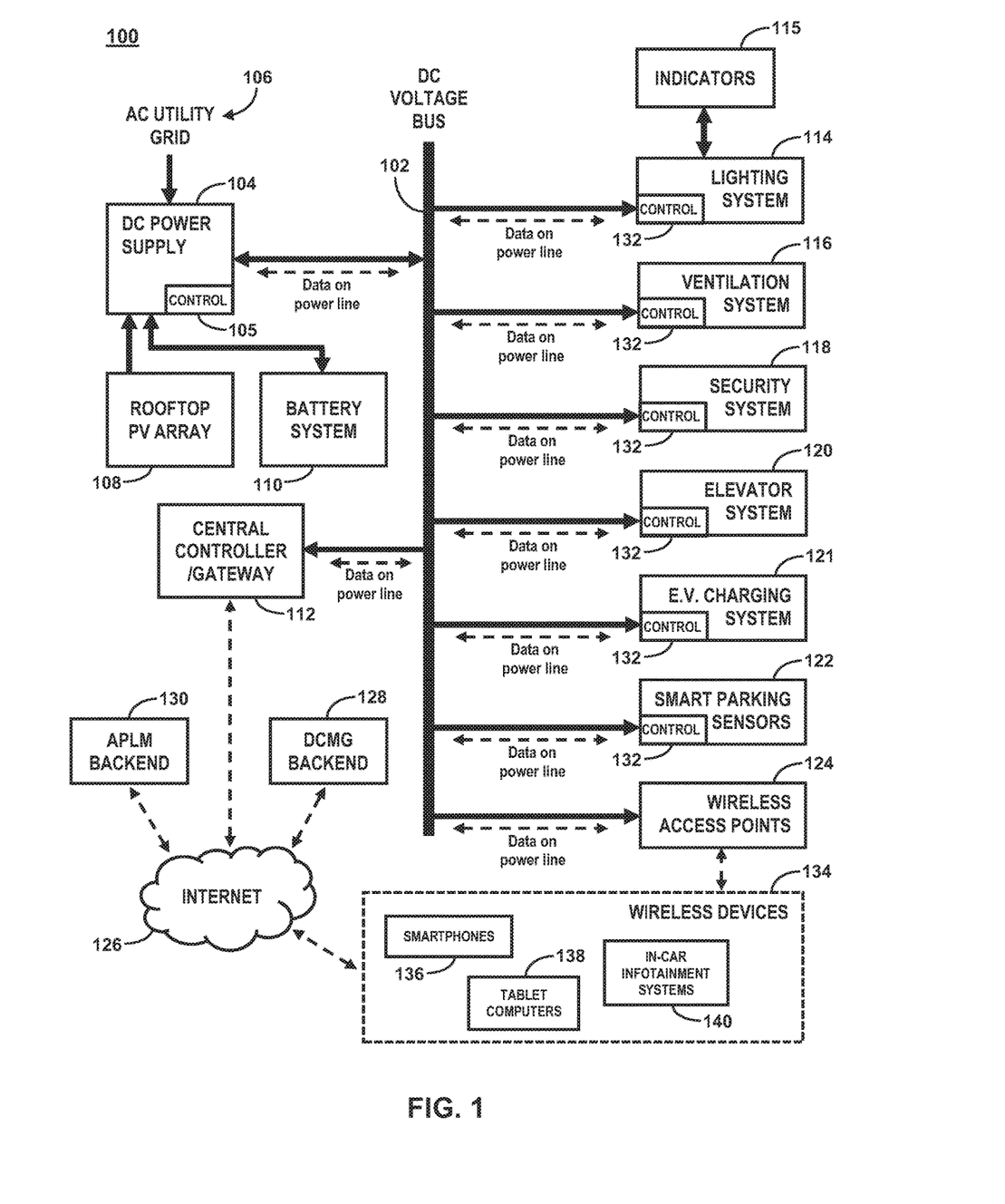
FIG. 1 shows an exemplary embodiment of a power distribution system for a parking structure.

FIG. 1 shows a power distribution system 100 for a vehicle parking structure. As used herein, the term "vehicle parking structure" refers to any structure or plot of land which is utilized for parking any type of vehicle. Such vehicle parking structures may include, but are not limited to, multi-level parking structures, underground parking structures, or parking lots. Such vehicle parking structures generally have a plurality of defined parking spots at which vehicles may be parked, but needn't necessarily have defined parking spots. Such vehicle parking structures are sometimes organized into one or more rows of parking spots having lanes arranged between each row via which vehicles may navigate the parking structure.

The power distribution system 100 has a DC voltage bus 102 arranged throughout the vehicle parking structure and configured to distribute DC power throughout the vehicle parking structure to various DC loads. The DC voltage bus 102 generally comprises heavy gauge wire, suitable for efficient transmission of power, laid throughout the vehicle parking structure. In some embodiments, the DC voltage bus 102 has a nominal voltage of 380 Volts. In one embodiment, the DC voltage bus 102 is configured with a High Resistance Midpoint Ground (HRMG). In this embodiment, line-to-ground voltages of the DC voltage bus 102 never exceed +200 Volts and −200 Volts. In the event of a ground fault, midpoint grounding resistors limit the amount of current that can flow to ground through the faulting device to safe levels.

The power distribution system 100 includes one or more DC power sources connected to the DC voltage bus 102 and configured to provide DC power to the DC voltage bus 102. In one embodiment, the one or more DC power sources of the power distribution system 100 include a DC power supply 104 connected to the DC voltage bus 102 and configured to provide DC power to the DC voltage bus 102. In at least one embodiment, the DC power supply 104 is connected to an AC utility grid 106 and configured to convert AC power from the AC utility grid 106 to DC power that is provided to the DC voltage bus 102. The DC power supply 104 includes an AC/DC converter or rectifier circuit configured to convert to convert AC power from the AC utility grid 106 to DC power that is provided to the DC voltage bus 102. In some embodiments, the DC power supply 104 configured for bi-directional power conversion and includes a bidirectional AC/DC inverter circuit configured to convert DC power from the DC voltage bus 102 to AC power for the AC utility grid 106. In this way, the DC power supply 104 can be configured to convert excess DC power to AC power for export to the AC utility grid 106.

A DC power distribution system, such as the power distribution system 100, is sometimes called a "DC Microgrid." In many cases, a DC power distribution system has reduced energy conversion losses and other efficiencies. One significant benefit of a DC power distribution system is the ease of integrating alternative and renewable energy sources. Particularly, in one embodiment, the one or more DC power sources of the power distribution system 100 include a photovoltaic array 108 connected to the DC power supply 104 and configured to generate DC power, which is provided to the DC voltage bus 102 via a DC/DC converter of the DC power supply 104. Alternatively, in some embodiments, the photovoltaic array 108 is connected directly to the DC voltage bus 102 or connected to the DC voltage bus 102 via an additional DC/DC converter that is separate from the DC power supply 104. The photovoltaic array 108 is can be arranged on a roof top of the parking structure utilizing solar carports, but may also be arranged in any suitable location including ground mounting or on mounting on nearby building rooftops. In other embodiments, the one or more DC power sources of the power distribution system 100 include on-site wind or hydro systems configured to generate DC power, which can be similarly integrated into the power distribution system 100. In further embodiments, the one or more DC power sources of the power distribution system 100 include dispatchable energy sources such as fuel cells, stationary fossil-fuel (or bio-fuel) generators, or Combined Heat & Power (CHP) generators, which are connected to the DC voltage bus 102 directly, via the DC power supply 104, or via additional converters and configured to provide DC power to the DC voltage bus 102.

In some embodiments, the one or more DC power sources of the power distribution system 100 includes a battery system 110 or other energy storage device configured to receive and store energy from the DC power supply 104 and to provide DC power to the DC voltage bus 102 via a bidirectional DC/DC converter of the DC power supply 104. Alternatively, in some embodiments, the battery system 110 is connected directly to the DC voltage bus 102 or connected to the DC voltage bus 102 via an additional bidirectional DC/DC converter that is separate from the DC power supply 104. The battery system 110 may also provide power for emergency power to the vehicle parking structure in the case of a loss of all or some of the utility grid power (blackout or brownout). In one embodiment, the DC power supply 104 includes a controller 105 configured to manage a power flow of the photovoltaic array 108 and the battery system 110 to participate in demand response, peak load reduction, demand charge reduction, and other cost saving power management techniques.

Control System Utilizing Power Line Communication

With continued reference to FIG. 1, the power distribution system 100 includes a control system that advantageously utilizes the DC voltage bus 102 for data communications between controllers and other devices connected to the DC voltage bus 102. Since the DC voltage bus 102 is isolated from AC utility grid 106, it is less subject to excessive amounts of noise cause by legacy AC loads. Additionally, DC loads connected to the DC voltage bus 102 can be designed to produce minimal noise on the power lines of the DC voltage bus 102. Accordingly, the DC voltage bus 102 is well suited for supporting practical and effective power line communications. Furthermore, by using the DC voltage bus 102 for data traffic, the need for additional wiring for the various sub-systems of the parking structure is eliminated or substantially reduced.

In some embodiments, the control system includes a central controller 112. The central controller 112 includes a power line communications bridge/transceiver and is configured to communicate with DC loads and other controllers connected to the DC voltage bus 102 using data signals transmitted on the DC voltage bus 102. Additionally, in some embodiments, the central controller 112 is configured to act as a gateway for the DC loads and other controllers connected to the DC voltage bus 102, thereby enabling the DC loads and other controllers to communicate with an external network, such as the Internet 126. In at least one embodiment, the central controller 112 performs control functions and is configured to transmit control signals to one or more DC loads and/or associated controllers to operate and control the DC loads. In one embodiment, the central controller 112 is configured to communicate with and control some operations of the DC power supply 104. In some embodiments, the central controller 112 function may be integrated with or contained within the DC power supply 104.

In one embodiment, the central controller/gateway 112 in communication with a DC Microgrid Backend 128 and/or an Active Parking Lot Management Backend 130 via the Internet 126. Both of the DC Microgrid Backend 128 and the Active Parking Lot Management Backend 130, which may be embodied as one or more remote servers, are configured to perform certain control functions for the power distribution system 100 and are configured to transmit control signals to one or more DC loads and/or associated controllers to operate and control the DC loads, via the central controller/gateway 112. In one embodiment, the DC Microgrid Backend 128 is configured to operate with the DC power supply 104 to manage energy usage, storage, and production for the power distribution system 100. In some embodiments, the DC Microgrid Backend 128 is configured and/or the central controller 112 is configured to receive demand response signals or utility time-of-day pricing signals from an operator of the AC utility grid 106. On the basis of the received demand or pricing signals, the DC Microgrid Backend 128 is configured to utilize the photovoltaic array 108 and the battery system 110 to enable peak load reduction, demand charge reduction, and demand response participation. Particularly, the DC Microgrid Backend 128 is configured to control export of power to the AC utility grid 106 and charging/discharging of the battery system 110 based on the received demand or pricing signals. In one embodiment, the Active Parking Lot Management Backend 130 is configured to manage various "smart parking" features, which are discussed in more detail below.

Additionally, as will be discussed below, the control system further includes a plurality of additional controllers 132 associated with each of the various DC loads in the vehicle parking structure. The additional controllers 132 are configured to receive control signals from the central controller 112 or other controllers 132, and configured to operate the associated DC loads in response to the control signals. In some instances, the additional controllers 132 are simplistic subordinate controllers configured only for performing basic operations with respect to the associated DC load, such as controlling an on/off state and other operations or operating parameters of the associated DC load. However, in other instances, the additional controllers 132 may perform more sophisticated management and control of an entire sub-system of the vehicle parking structure.

The term "control system" as used herein generally refers any or all of the controllers, software, servers, etc. related to the power distribution system 100. In one embodiment, the control system refers to combination of at least the central controller 112, the additional controllers 132, the DC Microgrid Backend 128, and the Active Parking Lot Management Backend 130. Any statement the control system is configured to perform some operation or function should be interpreted as one or more appropriate components of the control system being configured to perform the operation or function. As would be apparent to a person having ordinary skill in the art, although certain operations and functions may be described with respect to a particular component of the control system, the operations and functions can be similarly ascribed other components of the control system in alternative embodiments.

Exemplary DC Systems of the Vehicle Parking Structure

As has been discussed above, the power distribution system 100 includes several DC loads configured to operate using DC power and utilize power line communications via the DC voltage bus 102. In many cases, DC loads are advantageously less complex and more energy efficient than their AC counterparts. In the particular embodiments described herein, the DC loads of the power distribution system 100 comprise a lighting system 114, a ventilation system 116, a security system 118, an elevator system 120, and an electric vehicle charging system 121. However, the power distribution system 100 need not include all of the described DC loads and may include additional DC loads not described herein.

The lighting system 114 includes a plurality of lighting fixtures connected to the DC voltage bus 102. Each lighting fixture includes at least one DC light configured to operate using DC power. Such DC powered lighting may include, for example, energy efficient light emitted diode (LED) based lighting. Each lighting fixture may additionally include a light controller (which can be considered one of the additional controllers 132 discussed above) configured to control the at least one light of the lighting fixture. The light controller includes a power line communications bridge/transceiver and is configured to communicate with other lighting fixtures and/or the central controller 112 via the DC voltage bus 102 using data signals transmitted on the DC voltage bus 102. In some embodiments, the light controller is configured to control an on/off state of the light, a brightness of the light, and a color of the light.

The ventilation system 116 includes ventilation controllers (which can be considered one of the additional controllers 132 discussed above), ventilation fans, and air quality sensors. The ventilation controllers are configured to control the components of the ventilation system 116 and to communicate with the central controller 112 and other controllers via the DC voltage bus 102 using a power line communications bridge/transceiver of each ventilation controller. At least some components of the ventilation system 116 are configured to operate using DC power provided by the DC voltage bus 102. In one embodiment, the ventilation controllers are configured to control an on/off state of the ventilation fans and a speed of the ventilation fans. In one embodiment, the ventilation controllers are configured to receive air quality data from the air quality sensors and transmit the air quality data to the central controller 112. In at least the instance of underground parking structures, the central controller 112 is configured manage ventilation and air quality of the parking structure and to monitor for hazards, such as unsafe high carbon monoxide levels.

In one embodiment, the security system 118 includes one or more security system controllers (which can be considered one of the additional controllers 132 discussed above), security cameras, security gates, security kiosks, ticketing and payment kiosks, and intercom systems. The security system controllers are configured to control the components of the security system 118 and to communicate with the central controller 112 and other controllers via the DC voltage bus 102 using a power line communications bridge/transceiver of each security system controller. At least some components of the security system 118 may be configured to operate using DC power provided by the DC voltage bus 102.

In one embodiment, the elevator system 120 includes elevator controllers (which can be considered one of the additional controllers 132 discussed above) and elevators. The elevator controllers are configured to operate the elevators and to communicate with the central controller 112 and other controllers via the DC voltage bus 102 using a power line communications bridge/transceiver of each elevator controller. At least some components of the elevator system 120 are configured to operate using DC power provided by the DC voltage bus 102.

The electric vehicle charging system 121 includes one or more charging stations configured to connect to electric vehicles for charging. In some embodiments, the charging stations include charging controllers (which can be considered one of the additional controllers 132 discussed above) and DC/DC converters configured to convert DC voltages of the DC voltage bus 102 into DC voltages of a battery of an electric vehicle. The charging controllers are operably connected to the DC/DC converters and configured to operate the DC/DC converters to charge the electric vehicles. In some embodiments, the charging controllers are also configured to discharge batteries of the electric vehicles to provide power to the DC voltage bus 102, such as in a case of an emergency. The charging controllers are further configured to communicate with the central controller 112 and other controllers via the DC voltage bus 102 using a power line communications bridge/transceiver of each charging station controller. Particularly, in one embodiment, charging controllers is configured to transmit charging information to the central controller 112 via the DC voltage bus 102. Such charging information can include charging current/voltage, charging time, state of charge, charge pricing, charging speed, and charging power/energy, as well as similar discharge information. In some embodiments, the central controller 112 is configured to transmit control signals via the DC voltage bus 102 to the charging controllers to control charging operations of the charging stations. In some embodiments, the central controller 112 is configured to control the charging operations response to demand or pricing signals received from an operator of the AC utility grid 106.

Power Line Communication for Smart Parking Applications

In some embodiments, the control system is configured to utilize power line communication techniques to implement certain "smart parking" features for the vehicle parking. As discussed above, the use of the power line communication techniques greatly reduces the amount of data wiring that must be used in the parking structure. Accordingly, smart parking systems can be implemented at significantly reduced cost.

In some embodiments, the power distribution system 100 further includes a plurality of smart parking sensors 122 configured to detect various parameters relating to the parking structure for the purpose of implementing smart parking features. The smart parking sensors 122 generally include one or more sensor elements configured to detect or measure a parameter and to provide sensor data. Exemplary sensor elements may include ultrasonic/optical/microwave distance sensors, pressure sensors, heat sensors, cameras, microphones, and wireless activity sensors configured to detect the presence of mobile phones, Bluetooth/Wi-Fi signals, or various vehicle electronic systems. In some embodiments, the sensor elements may be housed within a nearby lighting fixture and draw power directly from the DC voltage bus 102.

The smart parking sensors 122 may include a sensor controller/relay (which can be considered one of the additional controllers 132 discussed above) connected to the DC voltage bus 102 and configured to receive sensor data from the sensor elements via a wired or wireless connection. The sensor controller/relay includes a power line communications bridge/transceiver configured to transmit the sensor data to the central controller 112, the Active Parking Lot Management Backend 130, or to other controllers of the control system, via the DC voltage bus 102. In some embodiments, the light controller of a nearby lighting fixture may act as sensor controller/relay for nearby sensor elements. As discussed below, the central controller 112 and/or the Active Parking Lot Management Backend 130 are configured to operate the various DC loads in based on the sensor data to provide smart parking features for the vehicle parking structure.

Figure 2:
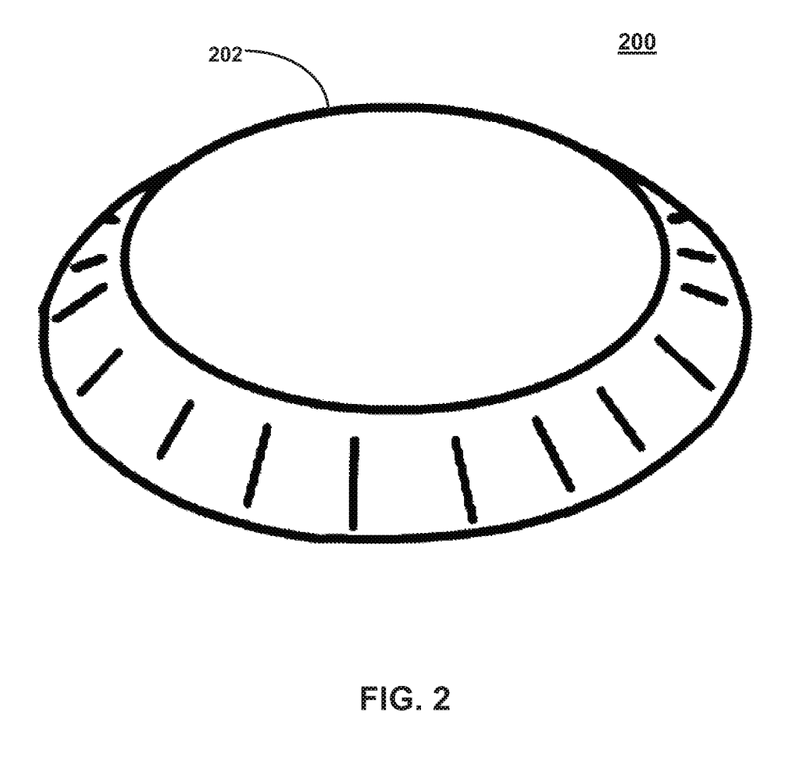
FIG. 2 shows an exemplary embodiment of a puck sensor for sensing parking space occupancy in the parking structure.

In some embodiments, the smart parking sensors 122 include vehicle occupancy sensors associated with each parking spot in the parking structure and configured to detect a vehicle occupancy status of the associated parking spot. FIG. 2 shows one embodiment of a puck sensor 200 for detecting vehicle occupancy of an individual parking spot. The puck sensor 200 includes a protective shell 202 that is embedded into, glued to, or otherwise attached to the floor of the parking structure under each parking spot. The puck sensors 200 communicate sensor data (vehicle occupancy data) to the Active Parking Lot Management Backend 130, the central controller 112, or other controller of the control system via a wired or wireless connection. In one embodiment, the puck sensors 200 are battery powered and not connected directly to the DC voltage bus 102. In such embodiments, the puck sensors 200 include wireless transceivers for communicating sensor data to the Active Parking Lot Management Backend 130 or other controller of the control system. In one embodiment, the puck sensor 200 includes a low power LoRa transceiver configured to connect to the Internet 126 or a controller connected to the DC voltage bus 102. In one embodiment, sensor controllers/relays are connected to the DC voltage bus 102 and configured to receive sensor data from the pucks sensors 200 and forward the sensor data to the Active Parking Lot Management Backend 130 or other controller of the control system via the DC voltage bus 102.

In some embodiments, the smart parking sensors 122 includes further activity sensors configured to detect the presence and movements of pedestrians and vehicles as they move about the parking structure. The activity sensors may include cameras, heat sensors, or wireless activity sensors that detect wireless signals (e.g. Wi-Fi, Bluetooth) from a mobile phone or other device on the pedestrian and/or vehicle. As discussed with respect to the occupancy sensors, the activity sensors can be battery powered or directly connected to the DC voltage bus 102. In the case that the activity sensors are battery powered, the activity sensors include wireless transceivers for communicating sensor data to the Active Parking Lot Management Backend 130. The Active Parking Lot Management Backend 130 and/or the central controller 112 are configured to use information from the activity sensors to implement further smart parking features. In one embodiment, the Active Parking Lot Management Backend 130 and/or the central controller 112 are configured to operate at least one of the DC loads based on the sensor data from the activity sensors. In one embodiment, Active Parking Lot Management Backend 130 and/or the central controller 112 are configured to control an on/off state of one of more the DC lights of the lighting system 114 based on the detected presence of pedestrians within the parking structure.

The control system is configured to control at least some of the DC lighting fixtures of the lighting system 114 using control signals transmitted on the DC voltage bus. In particular, the central controller 112 is configured to control operations such as an on/off state, a brightness level, and a color of at least one DC light of the lighting system 114 using signals transmitted on the DC voltage bus 102. The control system provides remote control of the lighting fixtures for power saving purposes, but also for smart parking applications. In some embodiments, the control system is configured to control at least one DC lighting fixture of the lighting system 114 to indicate information to people in the parking structure. In one embodiment, the control system is configured to operate the lighting fixtures of the lighting system 114 to provide information regarding vehicle occupancy of parking spots in the parking structure.

In some embodiments, the lighting system 114 includes additional informational indicators 115, shown in FIG. 1. The indicators 115 may comprise colored lights or electronic displays configured to convey information to users of the parking structure, rather than to provide illumination for the parking structure. In one embodiment, the indicators 115 are attached to and powered by the lighting fixtures of the lighting system 114 using a wired connection to the nearest lighting fixture. Similarly, in one embodiment, the indicators 115 are controlled by the lighting controllers of the lighting fixtures of the lighting system 114 via wired or wireless network (CAN, Modbus, 802.11, Zigbee, etc). However, in other embodiments, the indicators 115 are independently attached to the DC voltage bus 102 and have independent controllers connected directly to the DC voltage bus 102.

Figure 3:
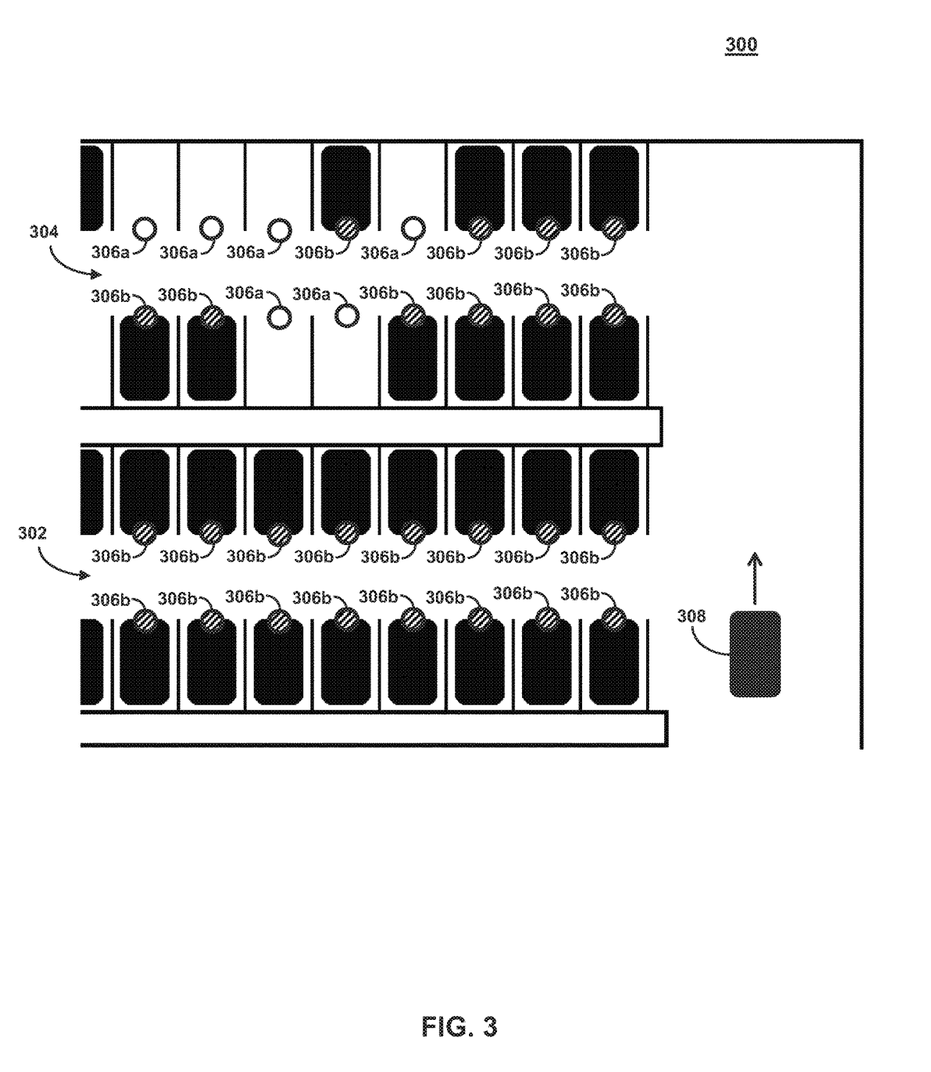
FIG. 3 shows an exemplary embodiment of a lighting system of the power distribution system used for indicating parking spot occupancy.

In one embodiment, at least some of the indicators 115 of the lighting system 114 are associated with one or more parking spots in the parking structure. In one embodiment, the control system is configured to operate indicators 115 to indicate whether an individual parking spot or a group of parking spots is occupied by a vehicle. FIG. 3 shows an area 300 of an exemplary parking structure. The area 300 of the parking structure includes a first row of parking spots 302 and a second row of parking spots 304. The first row of parking spots 302 is full and the second row of parking spots 304 has some remaining open parking spots. A plurality of parking indicators 306 of the lighting system 114 are arranged in the area 300 on the ceiling or on the ground. Each parking indicator 306 is associated with an individual parking spot in the parking structure. The parking indicators 306 may have their own fixture that is directly connected to the DC voltage bus 102, or may simply be connected to a nearby primary lighting fixture of the lighting system 114.

The control system is configured to receive occupancy information about the parking spots in the parking structure from the smart parking sensors 122, such as the puck sensor 200 discussed above. Based on the received occupancy information, the control system is configured to operate the indicators 306 to indicate whether each individual parking spot is occupied by a vehicle. This control of the indicators 306 can be performed by the Active Parking Lot Management Backend 130, the central controller 112, the light controller of a nearby lighting fixture, or some other controller of the control system. In one embodiment, the control system controls parking indicators 306a to light up green, indicating that the associated parking spot is unoccupied. Additionally, the control system controls parking indicators 306b to light up red, indicating that the associated parking spot is occupied by a vehicle. A user driving the vehicle 308, who is looking for a parking spot, can easily look out across the parking structure to find a green indicator 306a and proceed to that location to park his or her vehicle 308. In this way, the user can much more quickly locate an unoccupied parking spot. It is noted that the particular methods of indicating free parking spots can be implemented in many different ways by controlling the DC lights and/or indicators 115 in particular ways. For example, unoccupied parking spots can be indicated by dimming, strobing, or changing color independently or in coordination with other lighting fixtures or indicators 115.

In some embodiments, additional indicators 306 of the lighting system 114 are associated with individual rows, lanes, groups of parking spots, or floors of the parking structure and are configured to indicate whether the row, lane, group of parking spots, or floor of the parking structure is full or has available spots in response to signals from the corresponding sensor devices 122 that indicate the occupancy status of parking spots in the individual row, lane, or floor of the parking structure.

Figure 4:
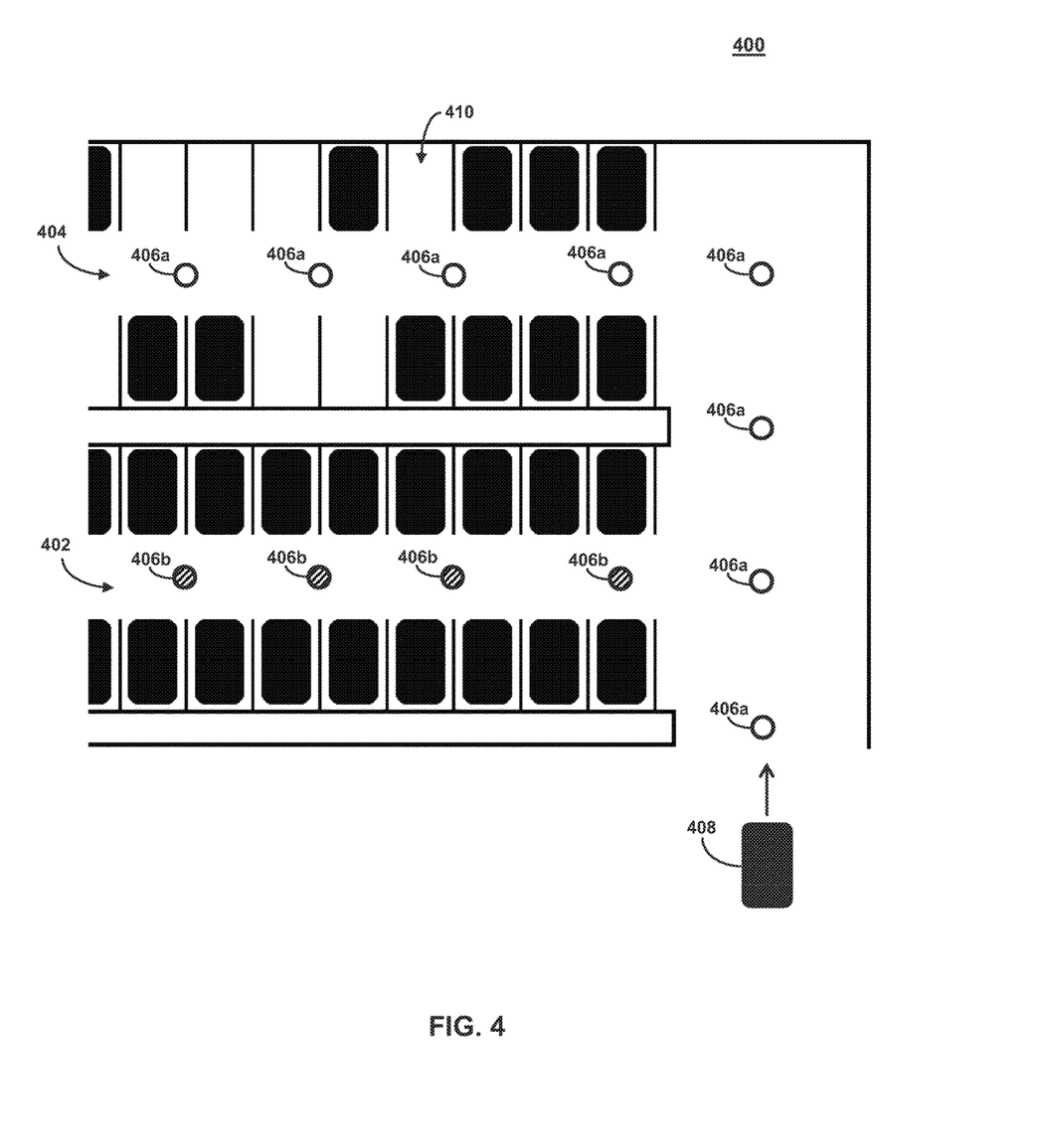
FIG. 4 shows an exemplary embodiment of a lighting system of the power distribution system used for assisting users in navigating the parking structure.

In another embodiment, the control system is configured to control the DC lights or the indicators 115 of the lighting system 114 to indicate a path toward unoccupied parking spots in the parking structure. FIG. 4 shows an area 400 of an exemplary parking structure, which is similar to the area 300 discussed above. The area 400 of the parking structure includes a first row of parking spots 402 and a second row of parking spots 404. The first row of parking spots 402 is full and the second row of parking spots 404 has some remaining open parking spots. A plurality of parking indicators 406 of the lighting system 114 is arranged in the area 400 on the ceiling or on the ground. The parking indicators 406 may have their own fixture that is directly connected to the DC voltage bus 102, or may be simply connected to a nearby primary lighting fixture.

The control system is configured to receive occupancy information about the parking spots in the parking structure from the smart parking sensors 122, such as the puck sensor 200 discussed above. Based on the received occupancy information, the control system is configured to operate the parking indicators 406 and/or the DC lights such that they indicate a path through the parking structure that leads to an open parking spot. This control of the indicators 306 can be performed by the Active Parking Lot Management Backend 130, the central controller 112, the light controller of a nearby lighting fixture, or some other controller of the control system. In one embodiment, the control system controls parking indicators 406a to light up green and the parking indicators 406b to light up red. A user driving the vehicle 408, who is looking for a parking spot, can follow the path indicated by the green parking indicators 406a to find his or her way to an open parking spot 410 in the row 404. It is noted that the particular methods of indicating the path through the parking structure can be implemented in many different ways by controlling the DC lights and/or indicators 115 in particular ways. For example, the path can be indicated by dimming, strobing, or changing color independently or in coordination with other lighting fixtures or indicators 115.

Similar to the method for indicating a path to a free parking spot, in one embodiment, the control system is configured to operate some of the DC lights or indicators 115 of the lighting system 114 to indicate a path through the parking structure from a recently parked vehicle to the nearest elevator, staircase, and/or exit. Similarly, the control system can also be configured to operate some of the DC lights or indicators 115 of the lighting system 114 to indicate a path through the parking structure from an elevator, staircase, and/or exit to a specific parking spot at a user's request via kiosk or mobile application.

In one embodiment, some of the indicators 115 of the lighting system 114 are electronic display devices (e.g. seven segment LED displays, or other display screens) connected to the DC voltage bus 102, to one of the lighting fixtures, or to one of the sensor devices 122. The display devices are configured to display a count of available spots in an individual row, lane, or floor of the parking structure in response to signals from the corresponding sensor devices that indicate the occupancy status of parking spots in the individual row, lane, or floor of the parking structure.

Returning to FIG. 1, in one embodiment, the power distribution system 100 further includes wireless access points 124 (e.g. Wi-Fi, Bluetooth, or similar) distributed throughout the parking structure. Each of the wireless access points 124 includes a power line communications bridge/transceiver and is configured to send and receive data using signals transmitted on the DC voltage bus 102. Additionally, the wireless access points 124 are configured to connect with various wireless devices 134 using various wireless technologies such as Wi-Fi, Bluetooth, or similar. The wireless devices 134 may include, but are not limited to, smartphones 136, tablet computers 138, and in-car infotainment systems 140. The control system, in particular the Active Parking Lot Management Backend 130, is configured to communicate with wireless devices 134, via the Internet 126 or wireless access points 124, to provide various smart parking services discussed below. In some embodiments, the wireless devices 134 may include a software application designed to interface with the Active Parking Lot Management Backend 130 and provide smart parking services to the user. In some embodiments, the wireless access points 124 are used to provide a connection to the Internet 126 for the wireless devices 134.

In one embodiment, the Active Parking Lot Management Backend 130 and/or the central controller 112 is configured to transmit, or "push," information to the wireless devices 134 of users of the parking structure wireless access points 124. The transmitted information may include emergency notifications, marketing materials such as shopping coupons, or information regarding the user's parking experience such as the location of the user's parked car, costs of the parking, etc. In one embodiment, since wireless signals such as Wi-Fi and Bluetooth contain unique identifiers, the control system is configured to associate a pedestrian with his or her vehicle and/or parking spot for the purposes of assisting a person with finding their vehicle. Likewise, a person entering the parking structure may be uniquely identified and associated with a shopping profile, for marketing purposes such as "pushing" coupons to the mobile device. The shopping profile could include historical information about prior visits to the parking structure and could be complemented with shopping information from nearby stores.

In some embodiments, the control system is configured to implement a payment system for the parking structure. In one embodiment, the Active Parking Lot Management Backend 130 is configured to operate the payment system. In other embodiments, controllers or software of the ticketing and payment kiosks of the security system 114 are configured to operate the payment system. In some embodiments, a user can connect to the payment system using a wireless device 134, such as his or her smartphone 136 or using an infotainment system 140 of his or her vehicle, via the wireless access points 124 or via a cellular data connection. In some embodiments, the user may pay for his or her parking via a smartphone or in-car software application. In some embodiments, all the necessary communications between the payment system, charging stations, cameras, sensors, and security gates are facilitated over the DC voltage bus 102. As a result, the payment system is implemented at a low cost.

In some embodiments, once a user has paid for the parking of his or her vehicle, the payment system communicates with the security system 114 to enable the user to leave the parking structure in their vehicle. Particularly, in one embodiment, the payment system communicates with a security gate of the security system 114 to open automatically when the user's vehicle approaches. In one embodiment, a camera system of the security system 114 can be used to identify a license plate of the user to determine if the user has already paid for his or her parking. In another embodiment, the gate has sensors configured to detect a smartphone 136 or in-car infotainment system 140 associated with a user who has already paid for his or her parking. In one embodiment, after a user has paid, the user is given a predetermined extra amount of time to leave the parking structure without being charged for additional parking time. If the user over-stays more than the predetermined extra amount of time after paying for parking, the payment system automatically charges the user for additional time using payment information that is on-file.

In some embodiments, parking payments are performed entirely automatically, without any user intervention. Particularly, frequent users of the parking structure can set up an account with the parking system that has payment information on-file. When a vehicle is parking in a parking spot, the payment system is configured to identify the vehicle to and find an associated account in the payment system. In one embodiment, cameras of the security system 114 are configured to identify the vehicle by reading the license plate number of the vehicle. In another embodiment, a sensor device 122 associated with each parking spot detects a smartphone or car infotainment system of the vehicle that corresponds to a particular user. Once the user has been identified, the payment system can automatically charge his or her account for the amount of time in the parking spot. When the user wants to leave, he or she may simply leave without having to worry about payment.

In some embodiments, the electric vehicle charging system 121 is configured to communicate charging information to the payment system. As a result, in the same ways described above, a user can automatically pay for charging their vehicle or pay for charging their vehicle using a software application on a wireless device 134, such as a smartphone 136 or in-car infotainment system 140. Additionally, users without registered accounts with the payment system can pay directly at a charging station. In some embodiments, the state of charge of an electric vehicle is communicated via the DC voltage bus 102 to the central controller 112 and/or the Active Parking Lot Management Backend 130. The central controller 112 and/or the Active Parking Lot Management Backend 130 is configured to transmit information regarding the state of charge of the electric vehicle to the vehicle owner's wireless device 134, a retailer, or a utility using wireless or wired methods. This information may be used, for example, to tell the vehicle occupant or retailer when there is sufficient charge for the vehicle occupant to finish shopping and return home, and/or may be used by the utility to manage peak demand by prioritizing vehicle charging rate and/or for dynamically managing electricity pricing for the electric vehicle charging service.

In some embodiments, the control system of the parking structure is configured to communicate with control systems for autonomous or semi-autonomous vehicles. Particularly, if a user arrives in the parking structure in an autonomous vehicle, the central controller 112 and/or the Active Parking Lot Management Backend 130 is configured to communicate with the vehicle via the wireless access points 124, or via a remote server associated with the autonomous vehicle. The central controller 112 and/or the Active Parking Lot Management Backend 130 are configured to transmit a map of the parking structure, routing information, and/or information regarding available parking spots to the vehicle. In one embodiment, the vehicle can autonomously navigate the parking structure to park in the nearest available parking spot. In other embodiments, the vehicle can simply display a route to the nearest parking spot to the user via an infotainment system 140. In one embodiment, the user can exit the vehicle near a pedestrian exit of the parking structure and the vehicle parks itself. When the user returns, the vehicle can automatically pick the user up at a pedestrian entrance to the parking structure. In this way, the smart parking structure can essentially facilitate an autonomous valet parking system.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A power system for a vehicle parking structure, the power system comprising:
    a DC voltage bus arranged throughout the vehicle parking structure and configured to distribute DC power throughout the vehicle parking structure;
    at least one DC power source operably connected to the DC voltage bus and configured to provide DC power to the DC voltage bus;
    a plurality of sensors arranged in the vehicle parking structure and operably connected to the DC voltage bus, the plurality of sensors being configured to detect at least one parameter relating to vehicle parking structure and transmit sensor data to the control system via the DC voltage bus, the plurality of sensors including a plurality of vehicle occupancy sensors configured to detect vehicle occupancies of parking spots within the vehicle parking structure and transmit vehicle occupancy data to the control system via the DC voltage bus;
    a plurality of DC loads arranged throughout the vehicle parking structure and operably connected to the DC voltage bus, the plurality of DC loads being configured to operate using DC power from the DC voltage bus, the plurality of DC loads including a plurality of visual indicators arranged throughout vehicle parking structure and configured to convey information relating to the vehicle parking structure; and
    a control system operably connected to the DC voltage bus and configured to (i) receive the sensor data from the plurality of sensors, including the vehicle occupancy data from the plurality of vehicle occupancy sensors, via the DC voltage bus and (ii) control an operation of at least one DC load in the plurality of DC loads based on the received vehicle occupancy data, using control signals transmitted via the DC voltage bus,
    wherein a first visual indicator of the plurality of visual indicators is associated with a first group of parking spots within the vehicle parking structure and configured to indicate at least one of (i) whether there are any unoccupied parking spots in the first group of parking spots and (ii) a count of unoccupied parking spots in the first group of parking spots, and
    wherein the control system is configured to operate the first visual indicator based on the received vehicle occupancy data to indicate the at least one of (i) whether there are any unoccupied parking spots in the first group of parking spots and (ii) the count of unoccupied parking spots in the first group of parking spots, using control signals transmitted via the DC voltage bus.

2. The power system of claim 1, wherein:
    at least a subset of the plurality of visual indicators are associated with individual associated parking spots within the vehicle parking structure and configured to indicate a vehicle occupancy of the associated parking spot, and
    the control system is configured to operate the subset of the plurality of visual indicators based on the received vehicle occupancy data to indicate the vehicle occupancy of the individual associated parking spots, using control signals transmitted via the DC voltage bus.

3. The power system of claim 1, wherein the control system is configured to operate the plurality of visual indicators to indicate a path through the vehicle parking structure to an unoccupied parking spot of within the vehicle parking structure based on the received vehicle occupancy data, using control signals transmitted via the DC voltage bus.

4. The power system of claim 1, the plurality of DC loads comprising:
    a plurality of DC lights arranged throughout the vehicle parking structure and operably connected to the DC voltage bus, the plurality of DC lights being configured to operate using DC power from the DC voltage bus,
    wherein the plurality of visual indicators includes at least a subset of the plurality of DC lights, and the control system is configured to operate the subset of the plurality of DC lights to indicate a path through the vehicle parking structure to an unoccupied parking spot of within the vehicle parking structure based on the received vehicle occupancy data, using control signals transmitted via the DC voltage bus.

5. The power system of claim 1, the plurality of sensors comprising:
    a plurality of activity sensors arranged in the vehicle parking structure and operably connected to the DC voltage bus, the plurality of activity sensors being configured to detect activity of people and vehicles within the vehicle parking structure transmit activity data to the control system via the DC voltage bus.

6. The power system of claim 5, wherein the control system is configured to (i) receive the activity data from the plurality of activity sensors via the DC voltage bus and (ii) control an operation of at least one visual indicator in the plurality of visual indicators based on the received activity data, using control signals transmitted via the DC voltage bus.

7. The power system of claim 6, the plurality of DC loads comprising:
    a plurality of DC lights arranged throughout the vehicle parking structure and operably connected to the DC voltage bus, the plurality of DC lights being configured to operate using DC power from the DC voltage bus,
    wherein the plurality of visual indicators includes at least a subset of the plurality of DC lights, and the control system is configured to (i) receive the activity data from the plurality of activity sensors via the DC voltage bus and (ii) operate the subset of the plurality of DC lights based on the received activity data, using control signals transmitted via the DC voltage bus.

8. The power system of claim 1, the plurality of DC loads comprising:
    at least one wireless access point operably connected to the DC voltage bus and configured to connect to wireless devices, the at least one wireless access point being configured to establish communications between the control system and the wireless devices using data signals transmitted via the DC voltage bus.

9. The power system of claim 1, the control system comprising:

at least one remote server configured to provide control signals for at least one DC load in the plurality of DC loads; and a central controller operably connected to the DC voltage bus, the central controller being configured to receive the control signals from the remote server and transmit the control signals to the at least one DC load in the plurality of DC loads via the DC voltage bus.

10. The power system of claim 1, the plurality of DC loads comprising:

an electric vehicle charging station operably connected to the DC voltage bus and configured to connect to a battery of an electric vehicle, the electric vehicle charging station including a DC/DC converter configured to charge the battery of the electric vehicle by providing DC power from the DC voltage bus to the battery of the electric vehicle, electric vehicle charging station being configured to communicate with the control system using data signals transmitted via the DC voltage bus.

11. The power system of claim 10, wherein the electric vehicle charging station is configured to transmit charging information to the control system via the DC voltage bus.

12. The power system of claim 10, wherein the control system is configured to control an operation of the electric vehicle charging station using control signals transmitted via the DC voltage bus.

13. The power system of claim 10, the at least one DC power source comprising:

a DC power supply operably connected to the DC voltage bus, the DC power supply being connected to an AC utility grid, the DC power supply being configured to provide DC power to the DC voltage bus by converting AC power from the AC utility grid, wherein the control system is configured to (i) receive signals from an operator of the AC utility grid and (ii) control an operation of the electric vehicle charging station based on the received signals, using control signals transmitted via the DC voltage bus.

14. The power system of claim 1, the at least one DC power source comprising:

a DC power supply operably connected to the DC voltage bus, the DC power supply being connected to an AC utility grid, the DC power supply having a bi-directional AC/DC inverter configured to (i) provide DC power to the DC voltage bus by converting AC power from the AC utility grid and (ii) export power from the DC voltage bus back to the AC utility grid, wherein the control system is configured to operate the DC power supply using control signals transmitted via the DC voltage bus.

15. The power system of claim 14, wherein the control system is configured to (i) receive signals from an operator of the AC utility grid and (ii) export power from the DC voltage bus back to the AC utility grid based on the received signals from the operator of the AC utility grid, using control signals transmitted via the DC voltage bus.

16. The power system of claim 1, the at least one DC power source comprising:

a photovoltaic array operably connected to the DC voltage bus, the photovoltaic array being configured to provide DC power to the DC voltage bus, wherein the control system is configured to monitor the photovoltaic array using data signals transmitted via the DC voltage bus.

17. The power system of claim 1, the at least one DC power source comprising:

a battery system having at least one battery operably connected to the DC voltage bus, the battery system including a bi-directional DC/DC converter configured to (i) receive DC power from the DC voltage bus to charge the at least one battery and (ii) to discharge the at least one battery to provide DC power to the DC voltage bus, wherein the control system is configured to operate the battery system to charge and discharge the at least one battery, using control signals transmitted via the DC voltage bus.

* * * * *